(12) United States Patent
Wahrmund et al.

(10) Patent No.: US 7,925,443 B2
(45) Date of Patent: Apr. 12, 2011

(54) METHOD FOR CONTROLLED SOURCE ELECTROMAGNETIC RECONNAISSANCE SURVEYING

(75) Inventors: Leslie A. Wahrmund, Kingwood, TX (US); Dmitriy Pavlov, The Woodlands, TX (US); Leonard J. Srnka, Bellaire, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 0 days.

(21) Appl. No.: 12/621,976

(22) Filed: Nov. 19, 2009

(65) Prior Publication Data

US 2010/0065266 A1    Mar. 18, 2010

Related U.S. Application Data

(63) Continuation of application No. 11/921,191, filed as application No. PCT/US2006/021007 on May 31, 2006, now Pat. No. 7,643,942.

(60) Provisional application No. 60/689,420, filed on Jun. 10, 2005.

(51) Int. Cl.
*G01V 1/40* (2006.01)
*G06F 19/00* (2011.01)

(52) U.S. Cl. ........................................................ 702/13
(58) Field of Classification Search .................... 702/13
See application file for complete search history.

(56) References Cited

U.S. PATENT DOCUMENTS

| 5,563,513 A | 10/1996 | Tasci et al. ..................... 324/359 |
| 6,603,313 B1 | 8/2003 | Srnka ............................. 324/354 |
| 7,126,338 B2 * | 10/2006 | MacGregor et al. .......... 324/334 |
| 2006/0197534 A1 | 9/2006 | Green et al. ................... 324/348 |

FOREIGN PATENT DOCUMENTS

| GB | 2395563 | 5/2004 |
| WO | WO01/57555 | 8/2001 |
| WO | WO02/14906 | 2/2002 |
| WO | WO2004/049008 | 6/2004 |
| WO | WO2004/053528 | 6/2004 |
| WO | WO2004/083898 | 9/2004 |
| WO | WO2004/093521 | 11/2004 |
| WO | WO2004/109338 | 12/2004 |
| WO | WO2005/006022 | 1/2005 |
| WO | WO2005/117326 | 12/2005 |

OTHER PUBLICATIONS

Amundsen, H. E. F. et al. (2004) "A sea bed logging (SBL) calibration survey over the Troll gas field," EAGE 66$^{th}$ Conference & Exhibition, Paris, France, Jun. 7-10, 4 pgs.

(Continued)

*Primary Examiner* — Cindy Hien-Dieu Khuu (57) ABSTRACT

Method for conducting an efficient and interpretable controlled-source electromagnetic reconnaissance survey for buried hydrocarbons. While a part of the survey area is being set up for measurement and data are being acquired, data from a nearby part of the survey area, surveyed just previously, are being rapidly processed and analyzed. If the analysis shows resistive anomalies of interest in a portion of a survey area, a fine-grid survey is quickly designed for that portion, and that survey is conducted next before moving source and receivers to a more distant part of the survey area.

7 Claims, 7 Drawing Sheets

OTHER PUBLICATIONS

Eadie, E. T. et al. (1980) "Optimal use of surface electrical methods for the direct detection of hydrocarbons," 50th Ann. Internat. Mtg., *Soc. Expl. Geophys. Expanded Abstracts*, pp. 1751-1772.

Eidesmo, T. et al. (2002) "Sea bed logging (SBL), a new method for remote and direct identification of hydrocarbon filled layers in deepwater areas," *First Break*, 20:3, pp. 144-152.

Ellingsrud, et al. (2002) "Remote sensing of hydrocarbon layers by seabed logging (SBL): Results from a cruise offshore Angola," *The Leading Edge*, pp. 972-982.

Hördt, A. et al. (2000) "A first attempt at monitoring underground gas storage by means of time-lapse multichannel transient electromagnetics," *Geophysical Prospecting*, 48, pp. 489-509.

Keller, G. V. (1968) "Electrical prospecting for oil," Quarterly Colorado School of Mines, 63, No. 2.

Keller, G. V. et al. (1996) "Case histories using time domain electromagnetics in oil and gas exploration: From inversion to imaging," 66th Ann. Internat. Mtg: *Soc. of Expl. Geophys.*, pp. 222-225.

Kong, F. N., et al. (2002) "Seabed logging: A possible direct hydrocarbon indicator for deep sea prospects using EM energy," *Oil and Gas Journal*, pp. 30-38 (May 13, 2002).

MacGregor, L. M. et al. (2000) "Use of marine controlled source electromagnetic sounding for sub-basalt exploration," *Geophysical Prospecting*, 48, pp. 1091-1106.

Rosten, T. et al. (2003) "A sea bed logging (SBL) calibration survey over the Ormen Lange gas field," *EAGE* 65th Conference & Exhibition, Stavanger, Norway, Jun. 2-5, 4 pgs.

Spies, B. R. (1983) "Recent developments in the use of surface methods for oil and gas exploration in the Soviet Union," *Geophysics*, 48, pp. 1102-1112.

Tompkins, et al. (2004) "Methods for the visualization and interpretation of marine controlled-source electromagnetic data," SEG 74th Annual Meeting and Int'l Exposition, Denver, CO, pp. 608-611.

Unsworth, M. J. et al. (1993) "Electromagnetic induction by a finite electric dipole over a 2-dimensional earth," *Geophysics*, 58.2, pp. 198-214.

Zhdanov, et al. (2000) "Electromagnetic inversion using quasi-linear approximation," *Geophysics* 65.5, pp. 1501-1513.

Zhdanov, et al. (2004) "3D inversion of electromagnetic data based on the quasi-analytical approximation for inhomogeneous backgrounds," 74th Annual SEG Meeting and Int'l Exposition, Expanded Abstracts, pp. 692-695.

EP Standard Search Report (2005) 2 pages.

PCT International Search and Written Opinion.

Kaufman, et al. (1983) *Frequency and transient soundings*, Elsevier Science B.V., pp. 257-284.

Zhdanov, et al. (1994) *The Geoelectrical Methods in Geophysical Exploration*: Elsevier Science B.V., pp. 119-124.

* cited by examiner

2000    4000
Subsea Depth (m)

METHOD FOR CONTROLLED SOURCE ELECTROMAGNETIC RECONNAISSANCE SURVEYING

CROSS REFERENCE TO RELATED APPLICATIONS

This Application is a continuation of U.S. National Phase application Ser. No. 11/921,191, filed Nov. 27, 2007 now U.S. Pat. No. 7,643,942, which is a National Stage of International Application No. PCT/US2006/021007, filed on May 31, 2006, which claims the benefit of U.S. Provisional Application No. 60/689,420, filed on Jun. 10, 2005.

FIELD OF THE INVENTION

This invention relates generally to the field of geophysical prospecting, including resource delineation and, more particularly, to the field of controlled-source electromagnetic (CSEM) surveying. Specifically, the invention is a method for the exploration for and subsurface mapping of reservoired hydrocarbons or other electrically resistive or conductive bodies of economic value using controlled-source electromagnetic ("CSEM") surveying.

BACKGROUND OF THE INVENTION

This invention addresses the problem of utilizing CSEM technologies to prospect for reservoired hydrocarbons over large tracts of acreage, particularly where little or no information about potential targets is available.

Controlled source electromagnetic surveying is an established geophysical method for identifying electrically anomalous conductive or resistive bodies in the subsurface. See, for example, Kaufman and Keller, *Frequency and Transient Soundings*, Elsevier Science B.V. (1983)). CSEM is typically but not necessarily used to explore subsurface regions under water (Marine CSEM, or "MCSEM"); i.e., CSEM may be used on land as well as in the marine environment. Mineral deposits, hydrocarbon reservoirs, and other geologic bodies, including volcanic, carbonate, and salt features, can have electric resistivity values different from background values (Zhdanov and Keller, *The Geoelectrical Methods in Geophysical Exploration*: Elsevier Science B.V. (1994)). MCSEM surveying can be used to measure these subsurface differences in the marine environment. Most MCSEM surveys are conducted by a moving vessel, towing a submerged electromagnetic signal source, typically a horizontal electric dipole transmitter, over an area where stationary electromagnetic receivers have been located on or near the tow-line, at or near the water bottom. The receivers record electromagnetic signals received, as a function of time.

To the best of the inventors' knowledge, all MCSEM surveys acquired to-date have been conducted in what may be called target-oriented mode. In target-oriented mode, surveys are located, designed, acquired, and analyzed with reference to specific subsurface targets, usually of scientific or economic importance, that have been previously identified using seismic data or other information. Conversely, if MCSEM surveys could be conducted in what may be called reconnaissance (or prospecting) mode, surveys could be located, designed, acquired, and analyzed without reference to specific subsurface targets or any pre-existing information. This would allow large tracts of marine acreage to be surveyed and assessed for the presence or absence of electrical anomalies consistent with reservoired hydrocarbons or other electrically resistive or conductive bodies of economic value. Doing this, however, would require innovative approaches to several aspects of conventional MCSEM surveying. The present invention provides such techniques.

Over the last several years, MCSEM surveying has been increasingly used (in target-oriented mode) to detect, map, and characterize hydrocarbon reservoirs beneath the seafloor. In target-oriented mode, the survey is located, designed, acquired, and analyzed with reference to specific targets, usually of scientific or economic importance, that have been previously identified using seismic data or other information. This is due to two main factors. First, optimal MCSEM signal response is highly dependent on optimizing acquisition parameters to best elucidate the survey target. Second, interpretation of MCSEM data in the absence of other information is notoriously non-unique; see for example, U.S. Pat. No. 6,603,313 to Srnka. Several studies have shown, however, that when data collection is optimized for a particular target, and MCSEM data are integrated with a priori information from seismic or other data regarding the location, depth, size, shape, and reservoir characteristics of that target, MCSEM data can be used to estimate reservoir fluid type. See, for example, Kong, F. N., et al., "Seabed Logging: A Possible Direct Hydrocarbon Indicator for Deepsea Prospects Using EM Energy," *Oil and Gas Journal*, 30-38 (May 13, 2002). This has generated considerable interest in the MCSEM field.

In conventional, target-oriented MCSEM surveying, parameters such as target length, width and thickness, target depth below the seafloor, and the surrounding three-dimensional resistivity structure are used to determine optimal transmitter and receiver locations for delineation of that specific target. Modeling and field results show that using optimal transmitter and receiver locations can be critical in imaging subsurface reservoirs, particularly for small, deep, and/or elongate targets, or for those characterized by low electrical contrast with surrounding subsurface bodies. This is because for most targets the maximum MCSEM response is recorded near the target edges where the low-frequency EM energy takes the longest pathway through and around the resistive body.

Similarly in conventional, target-oriented surveying, parameters such as water depth, target depth below the seafloor, and the surrounding three-dimensional resistivity structure, are used to calculate the optimal acquisition frequencies for delineation of the specific target. In MCSEM surveying, EM fields are generated by a transmitter injecting currents of a chosen low-frequency periodic waveform into the earth. Conventional MCSEM alternating-polarity square waveforms are routinely used. They have a broad frequency spectrum (cosine series), but concentrate the energy in one fundamental component. This type of "narrow-band" waveform focuses most of the transmitted energy to the depths that best delineate the target under investigation.

Further in conventional, target-oriented surveying, the MCSEM data are generally analyzed by comparing the measured response to that of 1D, 2D or (preferably) 3D forward, iterative EM models built from a priori information. Alternatively, subsurface resistivities can be determined by normalizing the electromagnetic field data to measured or synthetic background values. Electromagnetic inversion is also a conventional method for interpreting subsurface resistivities from MCSEM data. Full numerical inversion, however, is extremely computationally intensive, and generally benefits from the inclusion of a priori information.

This invention addresses the problem of utilizing MCSEM technologies to prospect for reservoired hydrocarbons over large tracts of marine acreage, particularly where little or no information about potential targets is available. In such reconnaissance mode, surveys can be located, designed, acquired, and analyzed without reference to specific subsurface targets or any pre-existing information.

The possibility of acquiring electromagnetic data in a reconnaissance or large-array mode, rather than in a target-oriented mode, has been previously considered in the published literature. Most of these are not MCSEM examples, including estimating shallow bathymetry using airborne electromagnetic surveys, detecting brine or contamination plumes using airborne and/or ground-based electromagnetic surveys, and exploring for minerals or hydrocarbons using airborne and/or ground-based electromagnetic surveys.

Patent publications WO 01/57555 and WO 02/14906 (inventors, Ellingsrud, et al.) purport to disclose "a method of searching for a hydrocarbon-containing subterranean reservoir." WO 01/57555, however, seems to provide no specific teachings on how survey design, acquisition, or analysis can be accomplished in anything other than the preferred, target-oriented mode (in which the reservoir's "approximate geometry and location are known"). WO 02/14906 teaches regarding surveying in "an undetermined area" that the "resistivity in the top layers should be mapped" (page 8, lines 10-12). What is needed is a fully enabled method for performing MCSEM in true reconnaissance mode. The present invention provides such a method.

SUMMARY OF THE INVENTION

In one embodiment, the invention is a method for conducting a controlled-source electromagnetic survey of the subsurface of a survey area, comprising: (a) dividing the survey area into at least two parts; (b) selecting a part of the survey area; (c) deploying electromagnetic receivers in a predetermined array on a grid in the selected part of the survey area; (d) moving an electromagnetic source to a plurality of positions along predetermined source lines on said grid; and (e) recovering recorded electromagnetic data from the receivers and sending the data to be analyzed while concurrently repeating steps (b)-(e) for a next part of the survey area.

The substantial concurrence of analyzing the data from one part of the survey area while acquiring data from another, preferably adjacent or nearby part, enables a resistive anomaly that is revealed in the first part, and that satisfies a predetermined criterion, to be re-surveyed using a finer-scale grid of source/receiver locations while the survey equipment is nearby.

BRIEF DESCRIPTION OF THE DRAWINGS

The present invention and its advantages will be better understood by referring to the following detailed description and the attached drawings in which:

FIGS. 4A1, 4A2, 4B1 and 4B2 show waveform and frequency spectra for a narrow-band (4A1-2) and a broad-band (4B1-2) waveform;

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

Figure 1:
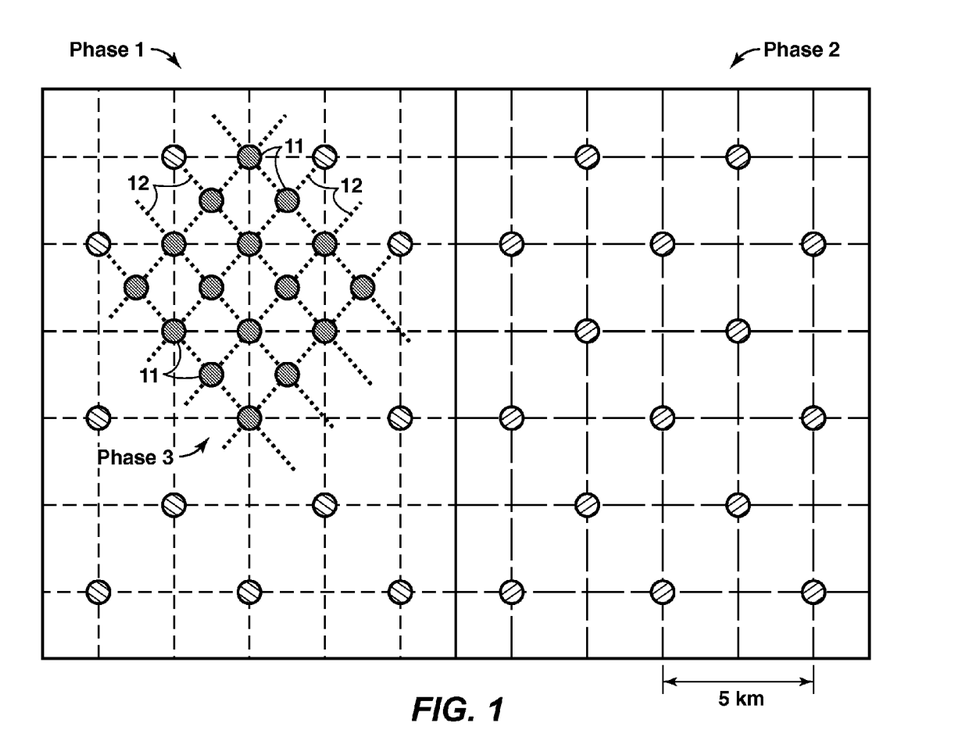
FIG. 1 shows receiver array positioning and source tow-lines for a three-phase MCSEM survey.

The present invention is a method for CSEM hydrocarbon prospecting using rolling 3D CSEM surveys. The description that follows will be in terms of CSEM performed in a marine environment, or MCSEM; however, the inventive method is not limited to marine application. The method is characterized by an initial "detection-scale" or "coarse-grid" 3D reconnaissance MCSEM survey, rapid processing and analysis of the data concurrent with concurrent data acquisition, and (in some embodiments) one or more "finer-grid" MCSEM surveys over smaller areas containing electrically resistive or conductive anomalies of interest identified from the coarse-grid surveying. The concept is illustrated in FIG. 1. FIG. 1 shows map-view plots of a two-phase coarse-grid, detection-scale reconnaissance survey, followed by a third-phase fine-scale survey over a resistivity anomaly identified in phase 1. The circles indicate (stationary) receiver locations, and the broken lines indicate source tow-lines. Phases 1 and 2 are performed on adjoining tracts. The additional receiver locations 11 and the source towlines 12 for the fine-scale survey over the Phase 3 area are obvious by inspection of FIG. 1.

"Fine-scale" MCSEM surveying of entire large-acreage tracts, that is, surveying with sufficient data density to estimate the electromagnetic (EM) properties of all potentially economic resistive or conductive anomalies within the survey area, would be cost-prohibitive. On the other hand, "coarse-grid" or detection-scale surveying, by itself, lacks the spatial resolution required for subsurface characterization. For example, a 4×4 km receiver spacing would be less than optimal for a 100 ohm-m resistive body of dimensions 700×400 m located 1000 m below the sea surface in a 1 ohm-m background, and hence would be a coarse grid in that context. An appropriate fine grid for the same hypothetical example might be 1×1 km spacing.

Previous published MCSEM surveys were conducted in target-oriented mode for two reasons. First, in its standard application, the tool is highly sensitive to the location, orientation, depth, and size of the survey target, and misidentifying any of these parameters can easily cause erroneous conclusions. Second, in its standard application, analysis of the MCSEM data is notoriously non-unique. Target-oriented MCSEM surveys are typically used to distinguish between geophysical hypotheses, such as if a particular reservoir mapped from 3D seismic data is brine- or hydrocarbon-filled. With the features of the present invention, however, MCSEM can be used to prospect for hydrocarbons or other resistive or conductive bodies of economic interest, in the absence of a priori knowledge. Features in some embodiments of the invention include the following:

1) the use of economic analysis in survey design (to define detection thresholds of economically-viable targets);

2) the use of 3D grid-style acquisition over areas where little or no information about potential targets is available;

3) the use of broad-band acquisition waveforms, allowing detection across a range of target depths in one application of a source line;

4) the use of rapid processing and analysis; and 5) the use of multi-stage surveying, including an initial coarse-grid, detection-scale reconnaissance survey, and subsequent finer-grid, surveys over anomalies detected using the coarse-grid surveying.

The present inventive method can be used where no information regarding potential subsurface targets is available. It can also be modified and applied where various amounts of subsurface information are available.

Figure 2:
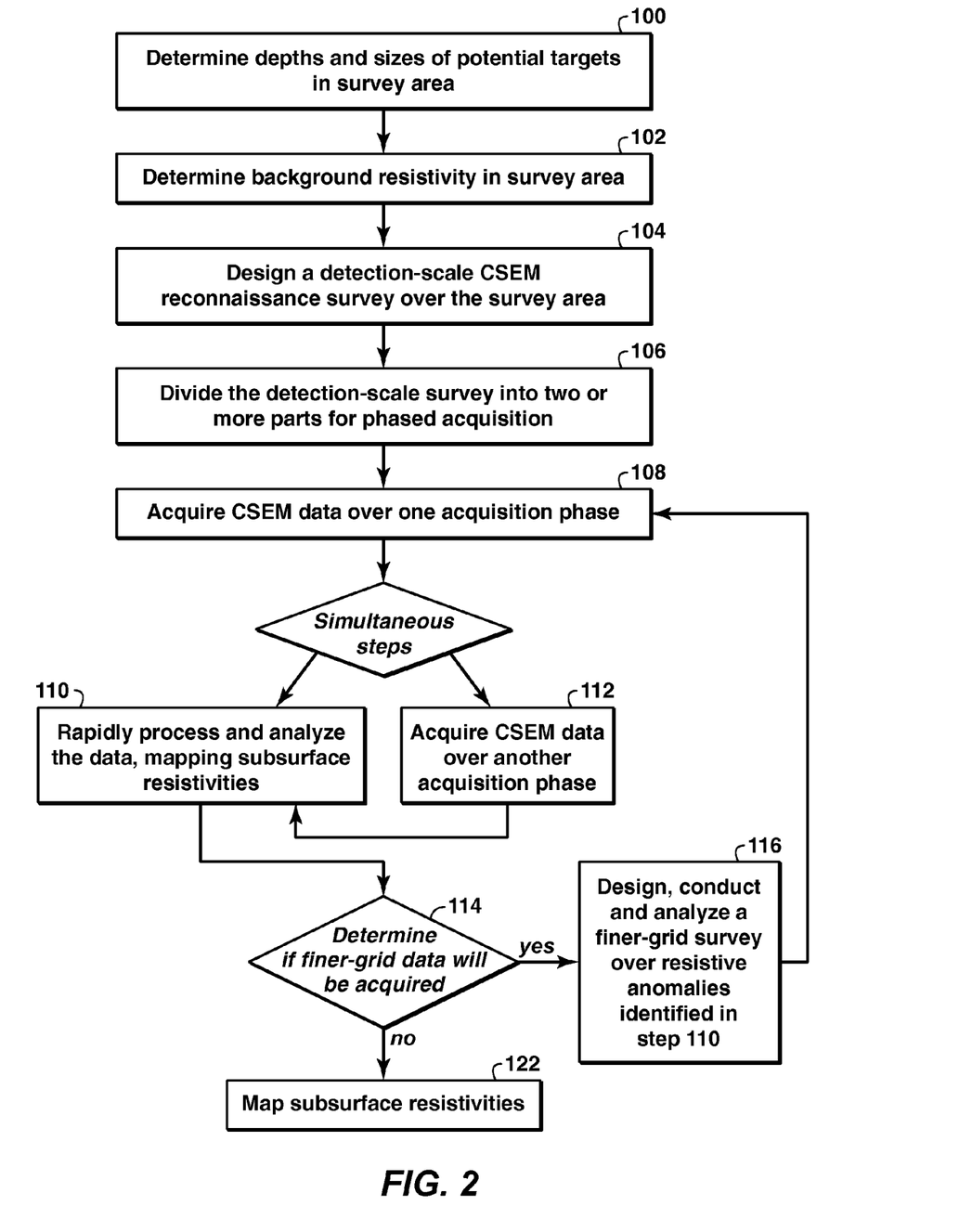
FIG. 2 is a flowchart illustrating one embodiment of the present invention.

FIG. 2 is a flowchart illustrating one embodiment of the present inventive method.

At step 100, analysis is done to determine the size, depth, and character required for potential electrically resistive or conductive targets within the survey area to be economic. This is done using standard methods well known to those skilled in the art.

At step 102, the background resistivity is determined. Preferably this is done by acquiring and analyzing MCSEM data from one or more locations within the survey area. Alternatively, background resistivity can be estimated using borehole measurements, magnetotelluric measurements, or values from analog locations. Determining background resistivity from all of these methods is done using standard techniques well known to those skilled in the art.

At step 104, a detection-scale, coarse-grid reconnaissance MCSEM survey is designed over the survey area. This includes determining source and receiver locations and acquisition waveforms and frequencies. In target-oriented MCSEM surveying, surveys are used to delineate the subsurface electrical properties of targets that have been previously located and characterized, generally using seismic and other types of data. Source array and receiver positions are optimized based on the location, orientation, shape, size, and depth of the target. In reconnaissance surveying, the objective of a coarse-grid, detection-scale surveying phase is to detect the presence or absence of potential economically viable targets within the study area. Where no a priori subsurface information is available, instruments are typically deployed in regular grid patterns over the entire survey area. The grid is not necessarily rectangular as in FIG. 1. For example, radial source tow-lines might be used. Optimal transmitter and receiver location and spacing is a function of many factors, including background resistivity, and the depth, size, aspect ratio, orientation, and other characteristics of potential economically-viable targets. Cost-effectiveness is achieved by optimizing the areal spacing of the transmitter and receivers. Based upon the economic analysis of step 100, the distribution and spacing of the transmitter and receiver arrays may be determined so that larger, potentially economic targets, have a high probability of detection, while smaller, generally uneconomic targets, have a lower probability of detection.

Figure 3A:
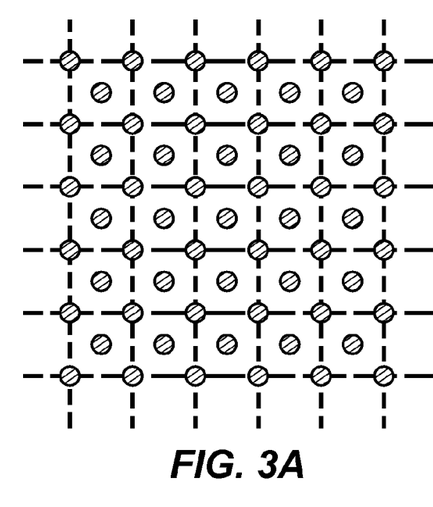
FIGS. 3A-C show three different examples of grid-style survey designs.
Figure 3B:
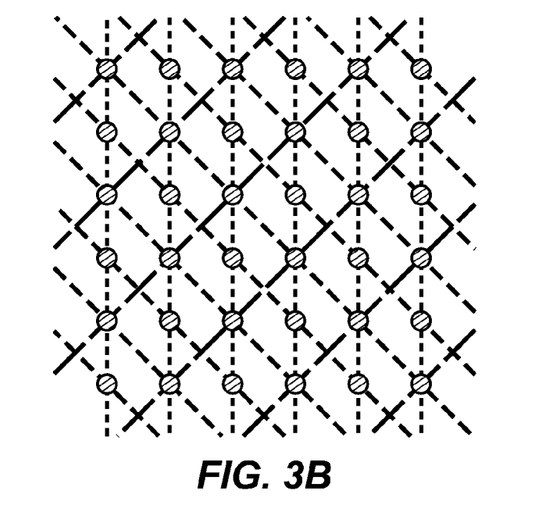
Figure 3C:
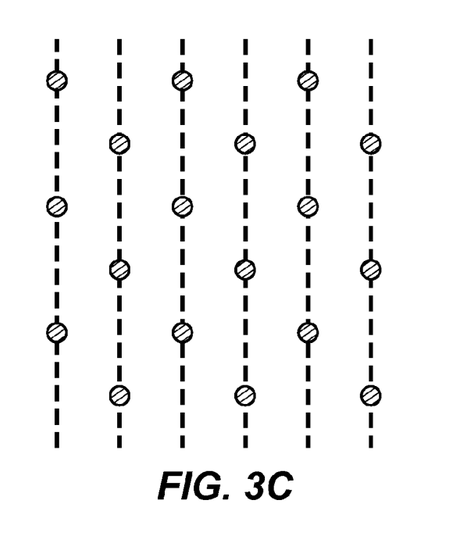

Without limiting the value of the invention where no a priori information is available, it may be cost-effective to modify the reconnaissance survey design where a priori subsurface information is available. For example, rectangular rather than square acquisition grids may be used where depositional or structural trends are known. Also, source and receiver arrays may be preferentially oriented along structural highs, given knowledge of their location. Also surveying may be minimized or omitted across synclinal basins. FIGS. 3A-C show three examples of regular transmitter and receiver configurations, in mapview. Again, receiver locations are indicated by circles, and source towlines (assuming a moving source is used) by broken lines. It should be noted that receiver and source arrays do not have to be geographically coincident (FIG. 3A is an example), and that transmitter patterns may include one (FIG. 3C), two (FIG. 3A), three (FIG. 3B) or more primary directions. Grids do not have to be regular or consistent across survey areas.

Figure 4A:
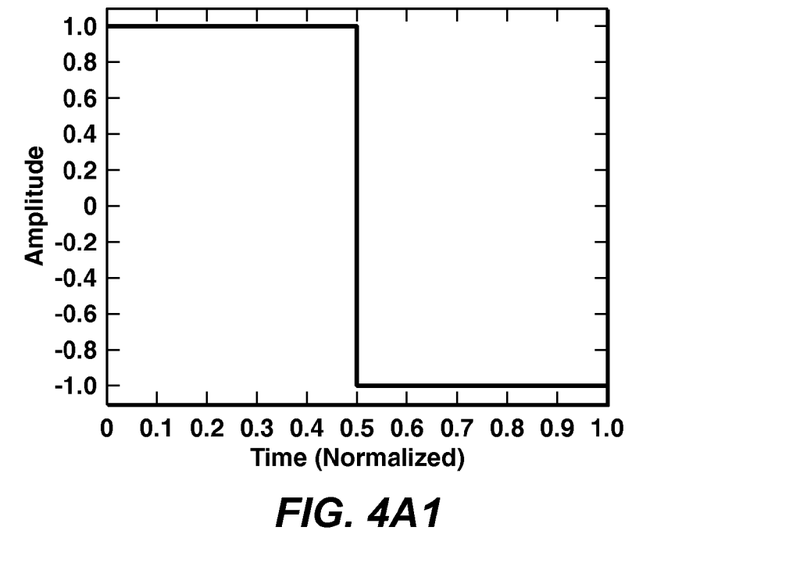
Figure 4A:
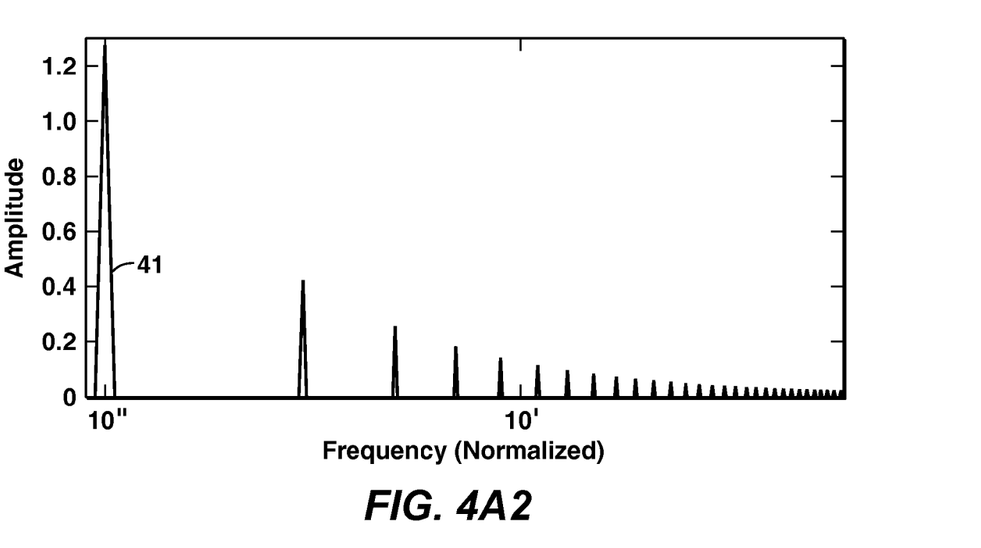
Figure 4B:
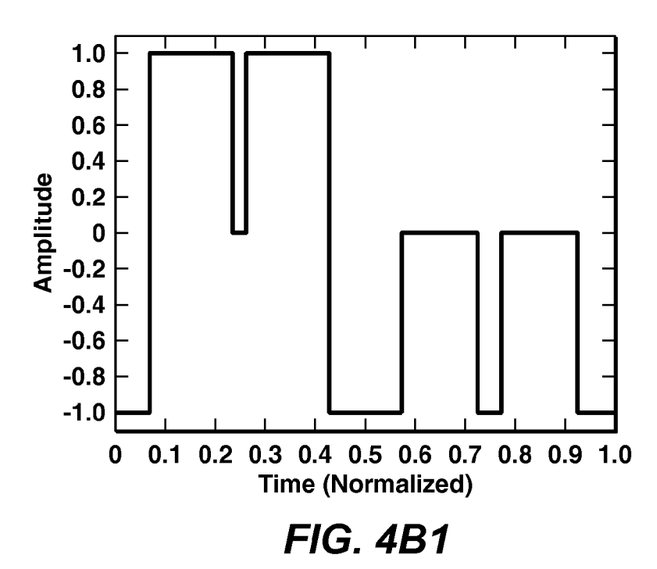
Figure 4B:
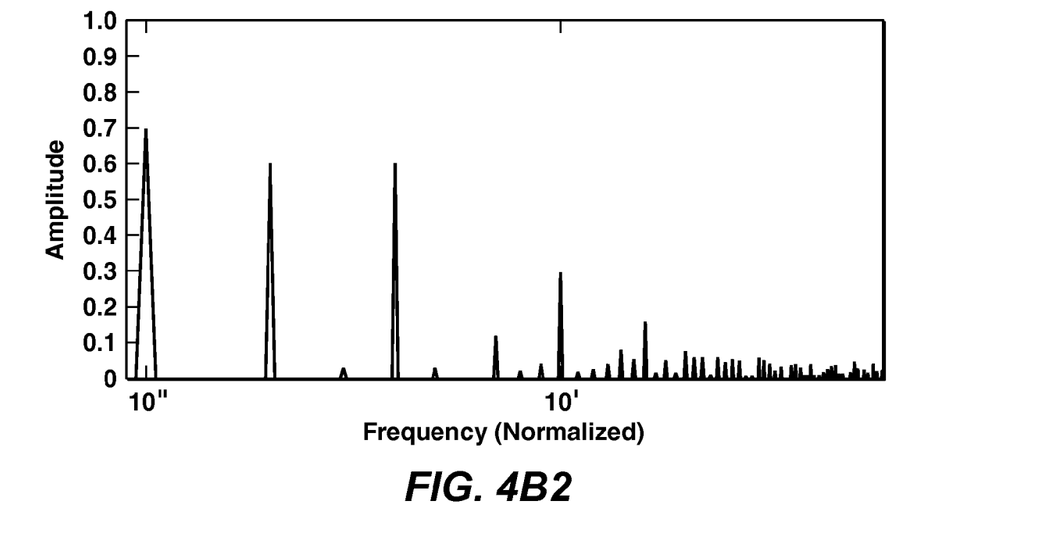

Another aspect in reconnaissance survey design (step 104) is designing or selecting an electromagnetic waveform and fundamental acquisition frequency. In MCSEM surveying, EM fields are generated by the transmitter's injecting electric currents (or magnetic field) of a chosen low-frequency periodic waveform into the earth or seawater/seafloor. The transmitter waveform controls the frequency content, distribution, and relative amplitudes of the frequencies, i.e., the sinusoidal components present in Fourier decomposition of the periodic source waveform. In target-oriented surveying, alternating-polarity square waves are routinely used. They have a broad frequency spectrum (cosine series), but concentrate the energy in one fundamental component, illustrated by peak 41 in the frequency spectrum (FIG. 4A2) of a square wave (FIG. 4A1). This type of "narrow-band" waveform focuses most of the transmitted energy to the depths that best delineate the target(s) under investigation. The fundamental acquisition frequency is selected based on background resistivities (step 102) and target depth. "Broad-band" waveforms, such as the "Tri-peak" waveforms disclosed by Lu and Srnka in WO2004/093521, are preferred for MCSEM reconnaissance surveying. Such waveforms subdivide the transmitted energy into several equal or nearly equal-magnitude components across a range of frequencies equally (or nearly equally) spaced on a logarithmic frequency scale, thereby allowing detection of potential electrical anomalies across a range of target depths in one pass along a source line. This allows the waveform to distribute the transmitted energy across the range of depths that may contain economic targets. Wave and spectra for a narrow-band square wave are illustrated in FIGS. 4A1 and 4A2, and for a broadband tripeak are illustrated in FIGS. 4B1 and 4B2. Alternatively, at far greater expense, the transmitter array can be deployed over the area of interest multiple times, broadcasting at different frequencies during each pass. (See, for example patent publications WO 01/57555 and WO 02/14906, inventors Ellingsrud, et al.)

At step 106 of FIG. 2, the detection-scale reconnaissance survey is divided into two or more parts for phased acquisition. It is the survey area that is divided into parts, or phases. As shown in later steps (110 and 112), this embodiment of the present inventive method involves simultaneously processing and analyzing data from a previous phase, while acquiring data in subsequent phases. Optimal division of the survey into parts involves consideration of such factors as survey geometry, maximum receiver deployment time (currently limited by battery life), timing of marine and geophysical crew changes (generally every 5-6 weeks), and similar factors.

Next, at step 108, the first phase of MCSEM data is acquired. Any MCSEM data acquisition technique may be used. Normally, electromagnetic receivers are deployed to planned locations, a horizontal electric dipole source is activated and deep-towed along planned transmitter lines, and the electromagnetic receivers containing recordings of the data are recovered. Alternatively, any suitable electromagnetic source arrays, either stationary or moving, can be used (such as wire loops or wire segments of any orientation). Similarly, any suitable electromagnetic receiver arrays, either stationary or moving can be used (such as dipole antennas or coils of any orientation).

Next, at steps 110 and 112, two substantially simultaneous work processes are conducted. The coarse-grid data from the first acquisition phase are rapidly processed and analyzed at step 110. Simultaneously, acquisition of MCSEM data over the second acquisition phase is conducted at step 112. Substantial concurrency of these work processes is a critical component of this invention. Rapid processing and analysis of the data allows subsequent finer-grid and higher-resolution surveys to be acquired during the same deployment as the initial coarse-grid, detection-scale, and reconnaissance survey. This can provide timely resolution-scale measurements over electrical anomalies, and can minimize acquisition expenses. Given the time-sensitive nature of competitive hydrocarbon exploration, and the fact that mobilization and transit costs for this specialized geophysical technique can be many hundred thousand US dollars (with acquisition costs in the millions of US dollars), the processing and analysis of initial data together with simultaneous acquisition of next phase data is an important feature of the invention.

Rapid data processing and analysis can be done onboard the acquisition vessel or elsewhere, by exporting the data off the vessel using satellite data links, helicopter, or other means. Using sufficient computational power, rapid data processing can be done using standard techniques well known to those skilled in the art.

Rapid data analysis can be accomplished in many ways, with the objective of producing volumes or maps of values of resistivity or relative resistivity. Preferably, constrained or unconstrained automated 3D numerical inversion is used, producing the most robust volume of resistivity values. However, it is currently computationally unrealistic to solve rapidly the inverse problem for a large detection-scale MCSEM survey. Alternatively, approximate inversion or fast-imaging could be used. Such approaches include quasi-linear (Zhdanov et al., "Electromagnetic Inversion Using Quasi-Linear Approximation," *Geophysics* 65, 1501-1513 (2000)) and quasi-analytical inversions (Zhdanov et al., "3D Inversion of Electromagnetic Data Based on the Quasi-Analytical Approximation for Inhomogeneous Backgrounds," 74th Annual *SEG Meeting and Int'l Exposition, Expanded Abstracts,* 692-695 (2004)), and constrained or unconstrained regularized 2D inversion methods (Tompkins and Weaver, "Methods for the Visualization and Interpretation of Marine Controlled-Source Electromagnetic Data," SEG 74*th Annual Meeting and Int'l Exposition,* Denver, Colo. (2004)). In addition, data normalizations can be used, including the single-offset single-frequency technique described by Ellingsrud, et al. ("Remote Sensing of Hydrocarbon Layers by Seabed Logging (SBL): Results from a Cruise Offshore Angola," *The Leading Edge,* 972-982 (2002)) or the multi-offset, multi-frequency technique of Green, et al (U.S. Provisional Application No. 60/659,325 (2004)). The preceding are examples of ways to perform the data processing and analysis.

Next, at step 114 of FIG. 2, a decision is made, based on the analysis and resistivity mapping from step 110, whether or not finer-grid MCSEM data should be acquired over any resistive anomalies detected in the coarse-grid survey phase of step 108. (The term "resistive anomalies" as used herein will be understood to include low resistivity (conductive anomalies) in addition to anomalies characterized by high resistivity.) Since many subsurface features are electrically resistive, including salt, carbonate, volcanic, and basement lithologies, it may be important to distinguish potential anomalies associated with hydrocarbon-filled reservoirs from those associated with other electrically resistive or conductive subsurface bodies. This can be done using visualization, geologic inference, and map pattern analysis from the maps or volumes of resistivity or relative resistivity produced at step 110. Any other data that may be available, such as seismic, gravity, magnetotelluric, or borehole, may be integrated in the analysis. If the decision at step 114 is to acquire finer-grid data over resistive anomalies, that survey is designed at step 116. Typically the area to be surveyed at a finer scale will be a sub-part of the part of the survey area that was surveyed in step 108 leading to the decision in step 114 to acquire more detailed data. However, the "sub-part" may be the entire part or any other area spanning parts defined in step 106 that the detection-scale data may suggest bears further, more detained investigation. Using the finer-scale survey designed in step 116, MCSEM data are acquired over the survey area sub-part, and another decision may be made at step 114 regarding acquisition of additional data. The process can be repeated multiple times, as needed. In preferred embodiments of the invention, the one or more fine-scale surveys prompted by an affirmative decision at step 114 are given priority over acquiring data in step 112 at a next part of the survey area. The rationale is to minimize distance over which survey equipment must be moved. After sufficient fine-grid data are acquired, the step 112 to step 110 and back to step 112 cycle is resumed until data for all survey parts identified at step 106 have been acquired and analyzed, with further fine-grid data acquired as may be indicated by step 114. In preferred embodiments of the invention, the progression from one part of the survey area to the next is done using proximity as a criterion, i.e., by moving to an adjoining or nearby part to minimize equipment relocation logistics. Once no additional data are to be acquired, a final data volume or map of subsurface resistivities is produced at step 122.

EXAMPLE

The following example illustrates how coarse-grid survey MCSEM can be used to detect resistive anomalies without a priori information regarding sizes, locations, or depths of potential targets. It also shows how rapid analysis and visualization tools can be used to map these resistive anomalies, and determine the location of a finer-grid survey over potential targets identified from the coarse-grid survey.

Figure 5:
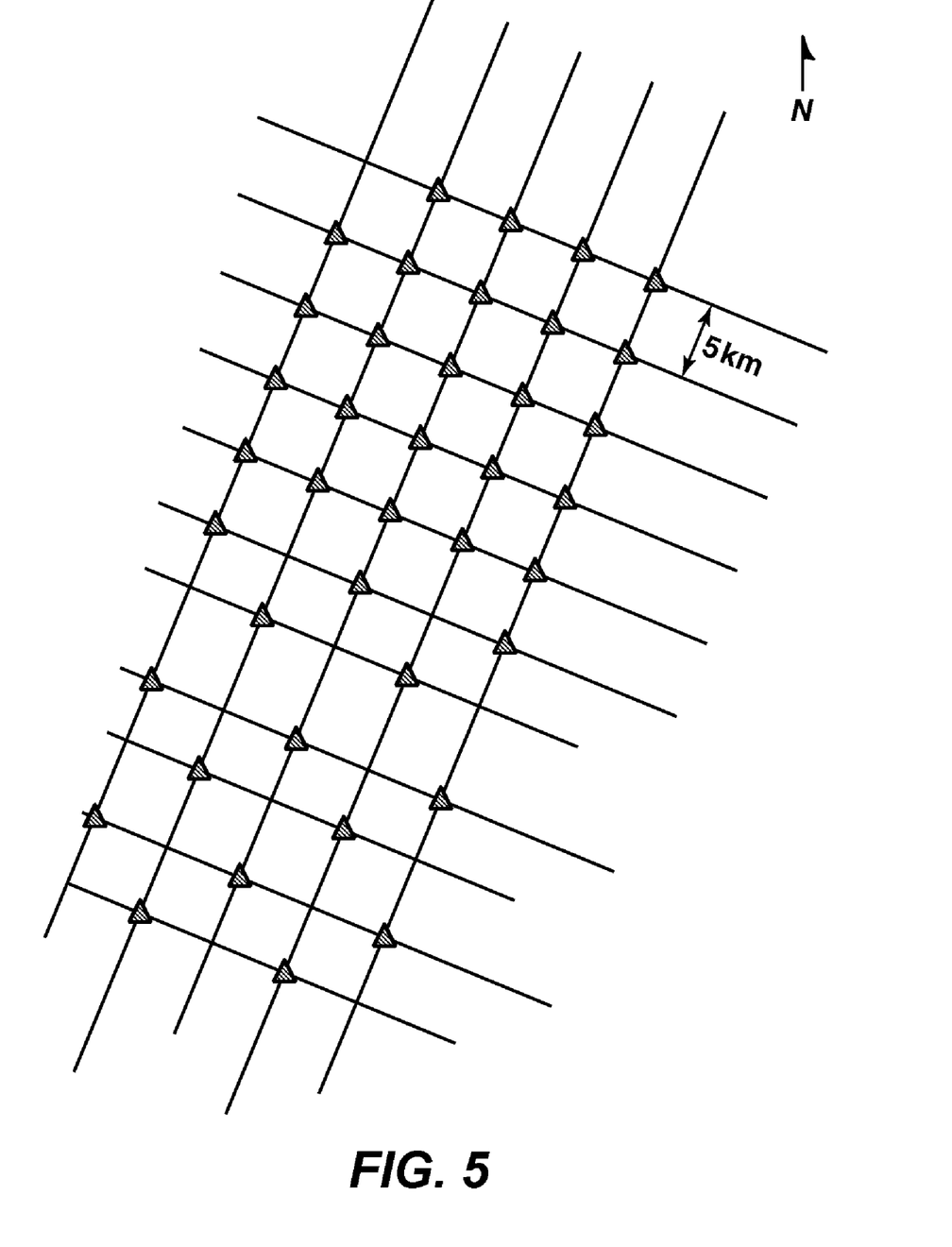
FIG. 5 is a map of an exemplary coarse-grid reconnaissance style survey.

FIG. 5 shows the design of an actual large, grid-style MCSEM survey. Here, receiver locations are indicated by triangles, and the lines represent source towlines. The survey consists of five NE-trending towlines of approximately 70 km each, eleven SE-trending towlines of approximately 35 km each, and 39 receivers located at towline intersections. The twenty-four receivers in the northern part of the survey are distributed at 5×5-km spacing; the fifteen receivers in the southern part of the survey are distributed with a 10×5 km spacing.

Figure 6A:
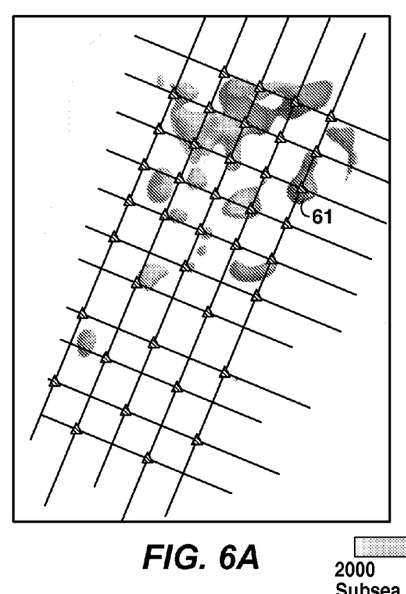
FIGS. 6A and 6B show a map of resistive anomalies detected from the survey of FIG. 5, with FIG. 6B also showing a map of a finer-grid survey planned over one of the anomalies.
Figure 6B:
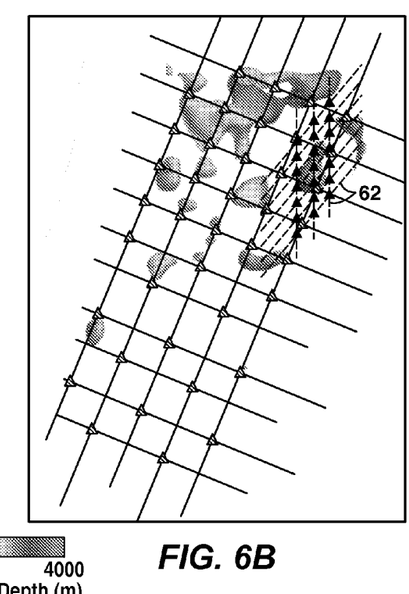

FIG. 6A is a map derived from rapid interpretation of the survey data, a result of step 110 in FIG. 2. The map shows bodies with resistivities greater than 2.5 Ohm-m over the survey area. The depth of the bodies is indicated by the gray scale. From prompt examination of FIG. 6A, it could be decided that geobody 61 is of interest, and that more data from its vicinity should be acquired (step 114 of FIG. 2). With the survey equipment still nearby due to the contemporaneous conducting of steps 110 and 112, the equipment could be quickly brought back to the part of the survey area represented by FIG. 5, and deployed in a fine grid at sub-part 62 of the survey area as illustrated in FIG. 6B.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

The invention claimed is:

1. A method for conducting a controlled-source electromagnetic survey of the subsurface of a survey area, comprising:
   (a) dividing the survey area into at least two parts;
   (b) selecting a part of the survey area;
   (c) deploying electromagnetic receivers in a predetermined array on a grid in the selected part of the survey area;
   (d) moving an electromagnetic source to a plurality of positions along predetermined source lines on said grid, and recovering recorded electromagnetic data from the receivers; and
   (e) sending the data to be analyzed while, concurrent with the analysis, repeating steps (b)-(d) for a next part of the survey area;
   wherein upon finding that the analyzed data from said selected part of the survey area reveal a resistive anomaly satisfying a predetermined criterion, a vicinity around said resistive anomaly is resurveyed using a more narrow band source waveform than was used before, said narrow band source waveform chosen to focus electromagnetic energy at the depth of the resistive anomaly, said resurvey being conducted before moving survey equipment substantially farther away from said anomaly.

2. The method of claim 1, further comprising repeating steps (b)-(e) until all parts of the survey area are surveyed.

3. The method of claim 1, wherein successive parts surveyed are selected based on proximity to each other.

4. The method of claim 1, wherein analysis results from one part of the survey area are received at the survey area before completion of surveying the next part of the survey area.

5. The method of claim 1, wherein the survey area is under water and the electromagnetic source is towed along the source lines.

6. The method of claim 1, wherein no prior knowledge of existence of resistive anomalies in the survey area is available.

7. A method for producing hydrocarbons from a subterranean region, comprising:
   (a) conducting a controlled-source electromagnetic survey of the subterranean region, said survey being conducted over a survey area and comprising the steps of:
      (i) dividing the survey area into at least two parts;
      (ii) selecting a part of the survey area;
      (iii) deploying electromagnetic receivers in a predetermined array on a grid in the selected part of the survey area;
      (iv) moving an electromagnetic source to a plurality of positions along predetermined source lines on said grid, and recovering recorded electromagnetic data from the receivers; and
      (v) sending the data to be analyzed while, concurrent with the analysis, repeating steps (i)-(iv) for a next part of the survey area;
   wherein upon finding that the analyzed data from said selected part of the survey area reveal a resistive anomaly satisfying a predetermined criterion, a vicinity around said resistive anomaly is resurveyed using a more narrow band source waveform than was used before, said narrow band source waveform chosen to focus electromagnetic energy at the depth of the resistive anomaly, said resurvey being conducted before moving survey equipment substantially farther away from said anomaly; and
   (b) producing hydrocarbons from at least one well drilled consistent with resistive anomalies identified in the electromagnetic data.

* * * * *